(12) United States Patent
Behar et al.

(10) Patent No.: US 7,641,380 B2
(45) Date of Patent: Jan. 5, 2010

(54) BLENDER/FOOD PROCESSOR BLADE ARRANGEMENT FOR SMALL THROATED BLENDER JARS

(75) Inventors: Moises Behar, Boca Raton, FL (US); Joseph Spencer, Purvis, MS (US)

(73) Assignee: Sunbeam Products, Inc., Boca Raton, FL (US)

( * ) Notice: Subject to any disclaimer, the term of this patent is extended or adjusted under 35 U.S.C. 154(b) by 488 days.

(21) Appl. No.: 11/707,690

(22) Filed: Feb. 16, 2007

(65) Prior Publication Data

US 2008/0198691 A1  Aug. 21, 2008

(51) Int. Cl.
  *A47J 43/046* (2006.01)
(52) U.S. Cl. .................. 366/205; 366/314; 241/282.1
(58) Field of Classification Search ......... 366/197–206, 366/314; 99/348; 241/282.1–282.2
  See application file for complete search history.

(56) References Cited

U.S. PATENT DOCUMENTS

| | | | | |
|---|---|---|---|---|
| 2,576,802 A | * | 11/1951 | Morris | 241/101.1 |
| 2,660,210 A | * | 11/1953 | Berglind | 241/199.12 |
| 2,702,571 A | * | 2/1955 | Murray | 241/294 |
| 2,771,111 A | * | 11/1956 | Seyfried | 241/292.1 |
| 2,794,627 A | | 6/1957 | Rodwick | |
| 3,064,949 A | * | 11/1962 | Dewenter | 241/195 |
| 3,139,917 A | * | 7/1964 | Elmore | 241/199.12 |
| 3,368,800 A | * | 2/1968 | Barnard, Jr. | 241/282.2 |
| 3,548,280 A | | 12/1970 | Cockroft | |
| 3,678,288 A | | 7/1972 | Swanke et al. | |
| 3,731,059 A | | 5/1973 | Wilson | |
| 3,738,583 A | * | 6/1973 | Berland et al. | 241/46.17 |
| 3,784,118 A | * | 1/1974 | Hurwitz | 241/282.1 |
| 3,943,421 A | | 3/1976 | Shibata et al. | |
| 3,951,351 A | | 4/1976 | Ernster et al. | |
| 4,462,694 A | * | 7/1984 | Ernster et al. | 366/205 |
| 4,541,573 A | | 9/1985 | Fujiwara et al. | |
| 4,822,172 A | | 4/1989 | Stottmann | |
| 4,889,248 A | * | 12/1989 | Bennett | 215/390 |
| 5,347,205 A | | 9/1994 | Piland | |
| 5,352,874 A | | 10/1994 | Gong | |
| 5,435,235 A | | 7/1995 | Yoshida | |
| 5,556,198 A | | 9/1996 | Dickson, Jr. et al. | |
| 5,567,049 A | | 10/1996 | Beaudet, Jr. et al. | |
| 5,823,672 A | * | 10/1998 | Barker | 366/205 |
| 5,829,341 A | | 11/1998 | Lin | |

(Continued)

FOREIGN PATENT DOCUMENTS

GB  2328145 A  *  2/1999

(Continued)

*Primary Examiner*—Charles E Cooley
(74) *Attorney, Agent, or Firm*—Seth M. Blum

(57) ABSTRACT

A blade assembly suited for both blending and food processing in small throat blender jars is provided. The blade assembly comprises a plurality of blade forms each designed to perform a specific blending or processing task while simultaneously working together and with the geometric restrictions of the jar to optimize the assembly's capability to crush ice, blend or mix liquids and/or semi-solid materials, and to chop, cut, or slice solid food items without the need for user interaction to clear compacted items from the blades and/or the walls or bottom of the jar during its operation. The improved performance also serves the beneficial side effect of improved bearing and motor life in the blender/food processor.

19 Claims, 6 Drawing Sheets

U.S. PATENT DOCUMENTS

| | | |
|---|---|---|
| 5,845,991 A | 12/1998 | Sundquist |
| 6,019,238 A | 2/2000 | Kindig et al. |
| 6,069,423 A | 5/2000 | Miller |
| 6,092,922 A * | 7/2000 | Kett et al. .................... 366/205 |
| 6,283,625 B2 | 9/2001 | Frankel et al. |
| 6,350,053 B1 | 2/2002 | Morin |
| 6,364,522 B2 | 4/2002 | Kolar |
| 6,402,365 B1 | 6/2002 | Wong |
| 6,550,703 B2 * | 4/2003 | Williams et al. ............. 241/100 |
| 6,609,821 B2 * | 8/2003 | Wulf et al. ................... 366/206 |
| 6,632,013 B2 | 10/2003 | Wulf et al. |
| 6,834,818 B2 * | 12/2004 | Lee ........................ 241/292.1 |
| 2002/0139884 A1 * | 10/2002 | Williams et al. ......... 241/282.1 |
| 2002/0141286 A1 * | 10/2002 | Wulf et al. ................... 366/206 |
| 2005/0099884 A1 * | 5/2005 | Lee ............................. 366/205 |
| 2008/0198691 A1 * | 8/2008 | Behar et al. ................. 366/205 |
| 2009/0114616 A1 * | 5/2009 | White et al. ................. 215/307 |

FOREIGN PATENT DOCUMENTS

| | | | |
|---|---|---|---|
| JP | 01221121 A | * | 9/1989 |
| JP | 01221122 A | * | 9/1989 |
| JP | 10192158 A | | 7/1998 |
| JP | 2004-201891 | * | 7/2004 |
| KR | 2019890007514 Y1 | | 10/1989 |

\* cited by examiner

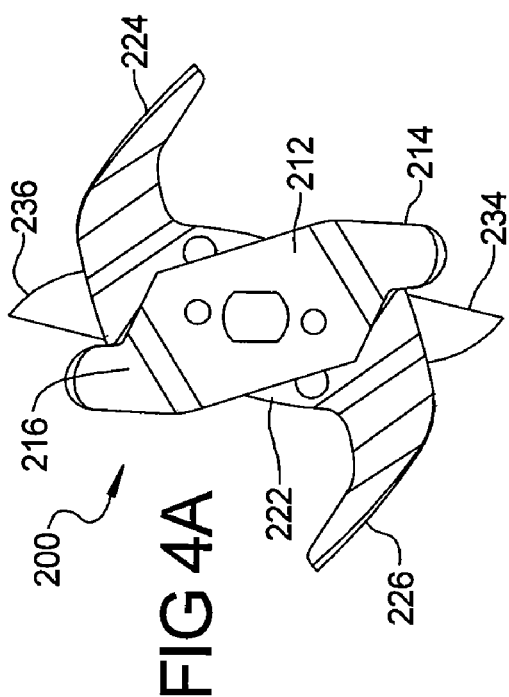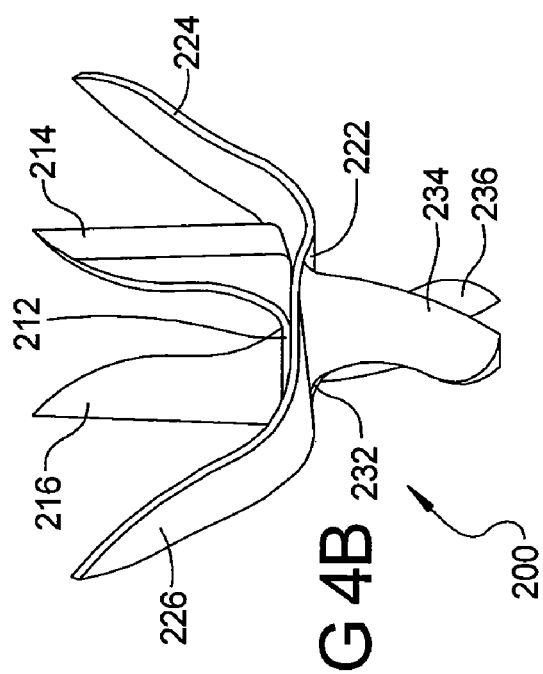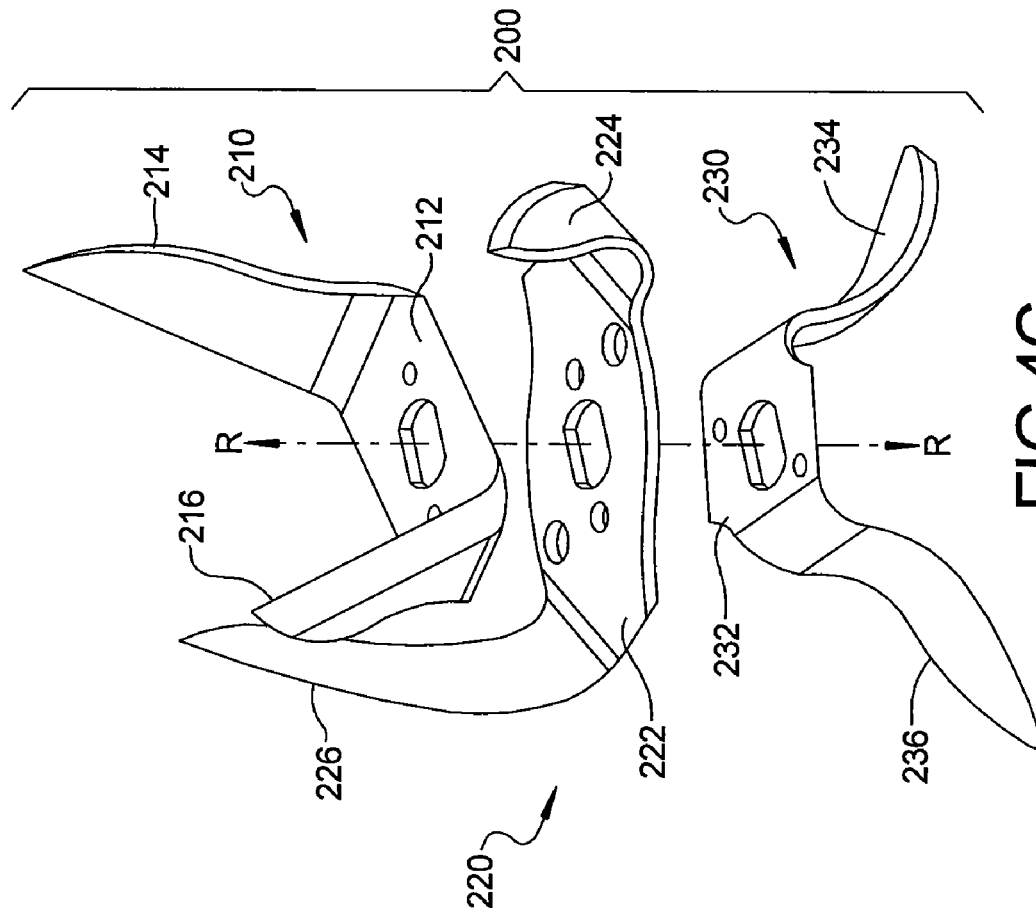

BLENDER/FOOD PROCESSOR BLADE ARRANGEMENT FOR SMALL THROATED BLENDER JARS

FIELD OF THE INVENTION

The present disclosure generally relates to a blade assembly for use in a kitchen appliance. In particular, the present disclosure is directed to a blade assembly suited for blending, food processing, and crushing ice. More particularly, the present disclosure is directed to a blade assembly for blending, food processing, and crushing ice in small throated blender jars.

BACKGROUND OF THE INVENTION

The statements of this section merely provide background information related to the present disclosure and may not constitute prior art.

Blenders are household devices often used to blend or mix drinks or liquids. Food processors are household devices used to chop, cut, slice, and/or mix various solid foods such as vegetables, fruits, or meats. Different blade designs and rotational speeds are used in blenders and food processors in order to accomplish the mixing or cutting actions desired.

Typically, the blade attachment in conventional blenders consists of two generally U-shaped blades, a top blade and a bottom blade, joined together at a central point with their respective ends oriented in opposite directions. Because of the blender blade design, conventional blenders usually are not able to chop, slice, or cut solid foods because solid food does not flow into the U-shaped blades without the addition of a liquid. Although the solid food may make some contact with the blades, typically at least some liquid must be added in order to liquefy or cut the solid food into very small pieces. Without some liquid, blenders tend to pulverize solid foodstuffs.

Similarly, typical food processing blade arrangements are designed to generate small pieces of foodstuffs not to liquefy or mix. Even when run for long periods the geometry of typical food processing blades fails to liquefy foodstuffs due to their inability to circulate the food within the jar and to continually rotate the processed foods back through the blades to process it into ever finer sizes.

In an aspect, the present disclosure is directed to a blade arrangement suited for providing the mixing and liquefying capabilities of typical blender blade arrangements and the ice crushing, chopping, cutting, and slicing capabilities of the a food processor blade arrangement. In an aspect, the disclosure is directed to such a multi-function blade arrangement for use in small-throat blender jars.

SUMMARY OF THE INVENTION

In accordance with the present disclosure a blade assembly for use in a small throat blender jar and having both blending/mixing, as well as enhanced food processing capabilities is disclosed. The blade assembly may comprise a base member having a central hollow post. Mounted with the post may be a rotating shaft which is connected to the appliance's motor at one end and the blade assembly at the other. The motor drives the rotating shaft which in turn moves the blade assembly causing the blending/processing of the liquid and/or food items within the blender jar.

The blade assembly is optimally designed to provide improved blending and mixing capabilities, as well as enhanced food processing operations. The assembly may comprise a plurality of blades in a stacked formation that operate in concert with each other to individually and cooperative achieve the desired handling of the items within the jar. In one embodiment of the present invention, the blade assembly may include a first or top blade form, a second or middle blade form, and a third or middle blade form joined together to form a blade stack.

The first or top blade form may be a generally U-shaped blade primarily useful for crushing ice. The top blade form may comprise a central, generally flat base portion extending radially outward with respect to the axis of rotation of the blade assembly. First and second wing portions may extend at an angle upward from opposing ends of the central base of the top blade form. It should be noted that the angle of each wing portion may be individually set to optimize the blade's performance individually and in conjunction with the remainder of the blade assembly and the internal jar geometry.

The third or bottom blade form may similarly be a U-shaped blade primarily intended for liquefying material and also for clearing the bottom of the jar to enhance the blade assembly's interaction with the jar contents. Combined with the top blade form, the opposing U-shaped blades (the top blade form opening upward and the bottom blade form opening downward) serve to function as typical blender/mixer blades. The bottom blade form may comprise a central, generally flat base portion extending radially outward with respect to the axis of rotation of the blade assembly. First and second curved wing portions may extend at an angle downward and outward from opposing ends of the central base of the bottom blade form. It should be noted that the angles of the curved wing portions of the bottom blade form are essentially identical so as to ensure an optimal clearing function of the lower portion of the jar without the introduction of any blade cavitation or turbulent flow that would unnecessarily pull the jar's contents back beneath the blade stack before its complete processing.

Finally, the second or middle blade form of the blade stack may comprise a central, generally flat base extending radially outward with respect to the axis of rotation of the blade assembly. As with the top blade form, a first and second wing portion may extend at an angle upward from opposing ends of the central base. The middle blade form, however, may be generally S-shaped before being bent to create the first and second wing portions. As such, first and second wing portions may also curve circumferentially away from the central base. Such a shape provides for a longer blade length which may have a continuous-radius edge. While bent into a generally U-shape, the continuous-radius edge allows the folded middle blade form to operate as effectively as typical flat food processing blades at chopping, cutting, and slicing solid food items, including vegetables, nuts, and meats.

Optimized blade geometries, as well as a blade stack layout that ensures limited, if any, interference by one blade form with the performance of another blade form ensures the blade assembly is suited for providing blending/mixing capabilities, while additionally providing enhanced food processing and ice crushing performance. All of the performance enhancements additionally serve to reduce wear-and-tear on the assembly's bearings and the appliance's motor.

BRIEF DESCRIPTION OF THE DRAWINGS

The organization and manner of the structure and function of the present invention, together with further aspects and advantages thereof, may be understood by reference to the following description taken in connection with the accompanying drawings, wherein like reference numerals identify like elements, corresponding part and/or features and in which:

FIG. 4A shows a top view of the blade stack of the blade assembly of FIG. 1;

FIG. 4B shows a side view of the blade stack of FIG. 3A;

FIG. 4C shows an exploded view of the blade stack of FIG. 3A; and

DETAILED DESCRIPTION OF THE PREFERRED EMBODIMENT

Figure 1:
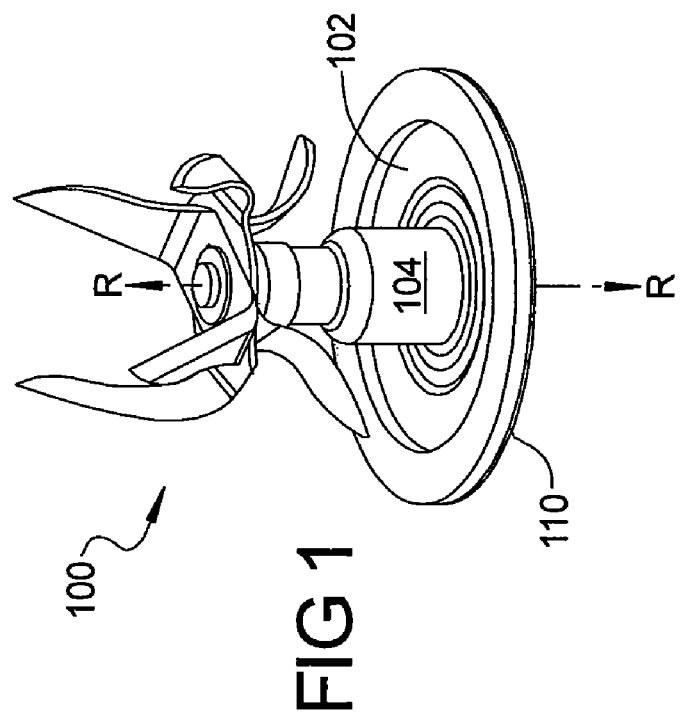
FIG. 1 shows a perspective view of a blade assembly in accordance with a preferred embodiment of the present disclosure.

While the present invention may be susceptible to embodiment in different forms, there are shown in the drawings, and herein will be described in detail, embodiments with the understanding that the present description is to be considered an exemplification of the principles of the invention and is not intended to limit the invention to that as illustrated and described herein. Instead, it is envisioned that those skilled in the art may devise various modifications and equivalents without departing from the spirit and scope of the appended claims.

Figure 2:
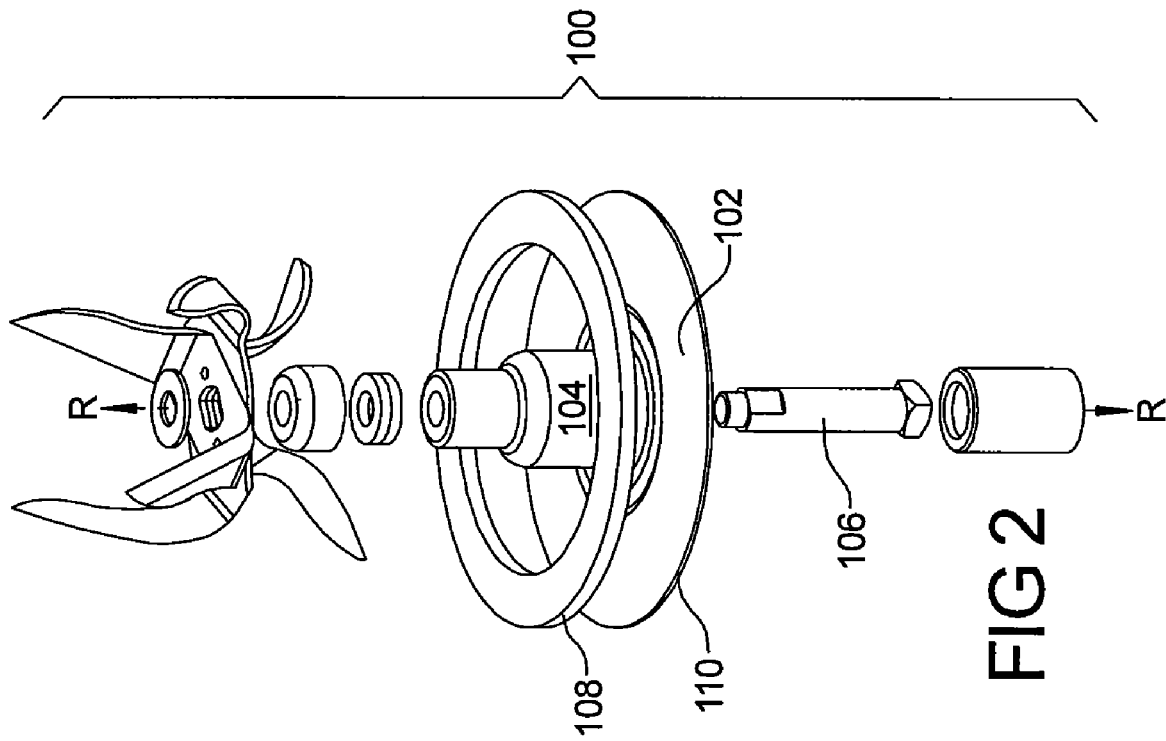
FIG. 2 shows an exploded view of the blade assembly of FIG. 1
Figure 3:
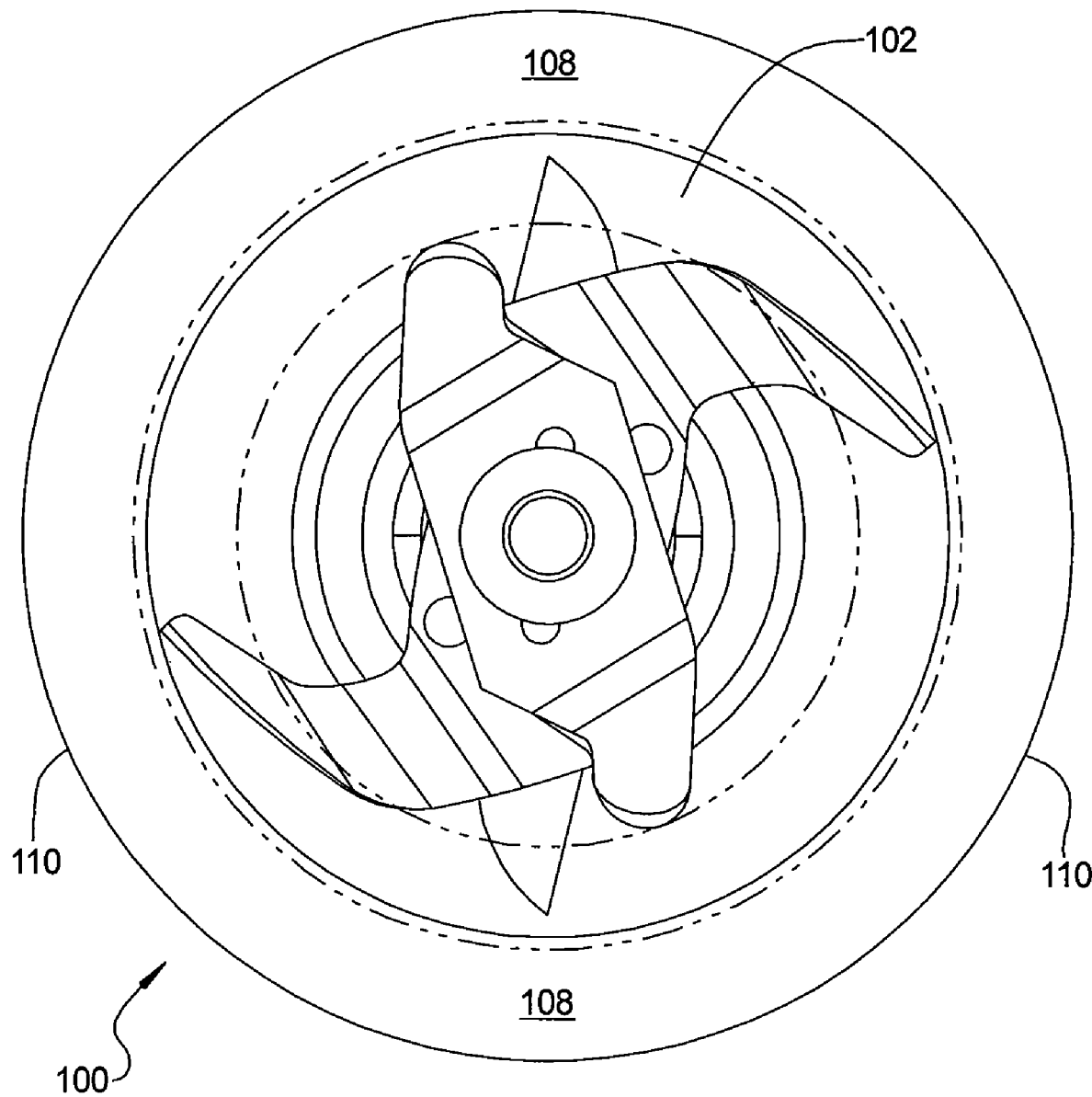
FIG. 3 shows a top view of the blade assembly of FIG. 1.

Referring now to FIGS. 1-3, a blade assembly 100 in accordance with the present disclosure is shown. Blade assembly 100 comprises a base 102 having a generally circular shape with an extended central hollow post 104. A collared rotational shaft 106 is mounted to and driven by the blender/food processor motor (not shown) at a first end. Rotational shaft 106 passes through the hollow post 104 and is removably affixed to a blade stack 200 at a second end. A sealing gasket 108 is provided about the outer periphery 110 of base 102 for sealing the blender/food processor jar 112 against the base 102 during operation.

Blade stack 200 is designed to allow for traditional blending functions while simultaneously providing improved food processing capabilities without the need to remove, change or alter the blade assembly 100 within the blender/food processor appliance. Blade stack 200, as shown in an exemplary embodiment in FIGS. 4A-4C, includes a top or first blade form 210, a middle or second blade form 220, and a third or bottom blade form 230. The blade forms 210, 220, and 230 may be made of any durable material such as metal, steel, carbon, composites, or any combinations of such material which can be sharpened and withstand the high stresses and heats generated in this environment.

The top blade form 210 and bottom blade form 230 are preferably similar to a conventional blender blade design (one or more generally U-shaped blades). In particular, the top blade form 210 includes a central, substantially flat base 212 that extends radially with respect to the rotational axis R-R of the blade assembly. A first wing portion 214 extends at a first angle upward from the base 212 and a second wing portion 216 extends at a second angle upward from an opposing end of the base 212. While it is preferred that first and second wing portion's respective angles are not equal so as to provide enhanced blending and processing, it should be noted that such angles may be identical.

As with the top blade form 210, bottom blade form 230 includes a central, substantially flat base 232 extending radially with respect to the rotational axis R-R of the blade assembly 100. First 234 and second 236 curved blades are preferably formed integrally with the base 232, and extend downward and outward from opposing ends of the base 232. The curved shape of the blades 234 and 236 enhances blending and processing, and permits the edges of the blades 234 and 236 to extend to adjacent the blade assembly base 102. In this manner, blended and processed items are dislodged and forced upward from the bottom of the jar 112.

The middle blade form 220 is an altered food processing blade design suited for use in a small throat jar 112. Wherein a typical food processor blade arrangement may include one or more generally flat blades extending radially outward from a central point of rotation, the middle blade form 220, in accordance with a preferred embodiment, is an S-shaped blade bent at opposing ends to a generally U-shaped configuration. The middle blade form 220 cooperates with the top and bottom blade forms 210 and 230 to enhance the circulation of blended or processed items while avoiding interference with the performance of the other blades.

Middle blade form 220 has a central, substantially flat base 222 extending radially from the axis of rotation R-R of the blade assembly 100. The central base 212, 222, and 232 of each of the top, middle and bottom blade forms 210, 220, and 230 are circumferentially offset from each other by a predefined angle as will be discussed in greater detail below. A first wing portion 224 extends upward and curves circumferentially away from the middle blade form's central base 222. Similarly, from an opposing end of the central base 222, a second wing portion 226 extends upward and curves circumferentially away from the central base 222. The resultant compound curve of the first and second wing portions 224 and 226 of the middle blade form 220 allow for a longer blade length for improved food processing capabilities.

The longer blade lengths allowed by the compound curve shape of the middle blade form 220 provides a continuous-radius edge along the entirety of each of the wing portions 224 and 226 so as to improve food processing performance of the blade assembly 100 similar to that of the typical flat blades found in food processors. A knife-sharpened edge additionally enhances the middle blade form's performance. Still further, the gull wing shape of the middle blade form 220 allows for its use in a small throat blender/processor jar 112 without negatively effecting the circulation of the blended/processed items during its operation. In part, the gull wing shape of the middle blade form 220 achieves this balance of improved performance and reduced circulatory impact by remaining an optimal distance from the throat wall 114 of the blender/processor jar 112. The gull-wing shape allows for a balancing of being far enough away from the wall 114 so as not to merely force items down into the bottom blade form 230 and thus liquefy them, while not placing the blade tips so far from the throat wall 114 as to fail to pull the processed items into the blade stack 200 for processing. As a result, the enhanced performance of the blade stack 200, and the assembly 100 as a whole, are directly related to the defined angles involved in shaping the middle blade form 220.

Figure 4D:
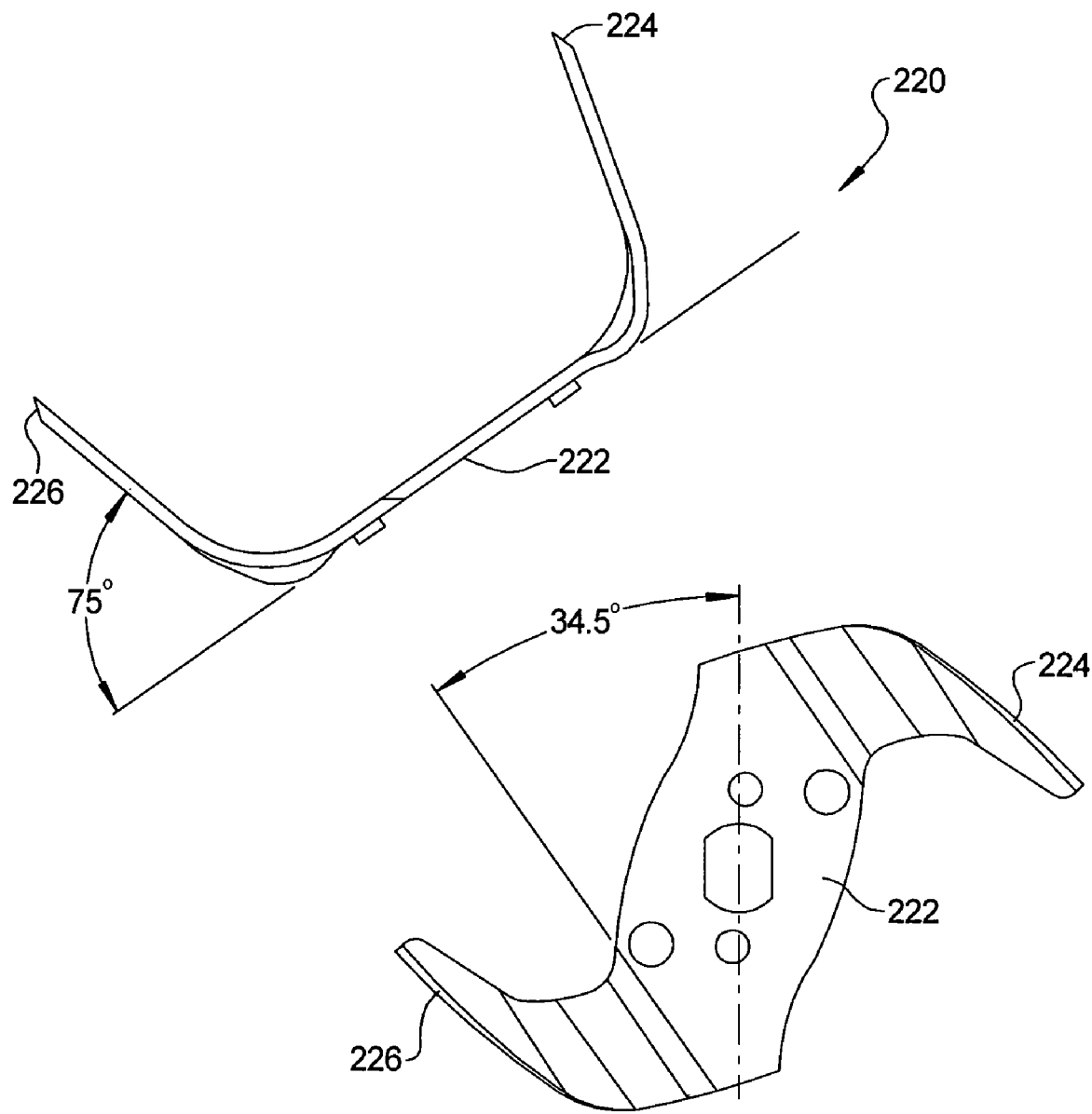
FIG. 4D shows a composite side and top view of the middle blade form of the blade stack of FIG. 4A and indicating blade angles relative to the horizontal and center line of the blade form.

The enhanced processing performance is also a direct result of the middle blade form's orientation to the top and bottom blade forms 210 and 230 as best seen in FIG. 4D. More specifically, it is preferred that the wing portions 224 and 226 of the middle blade form 220 make generally about a 75° angle with the horizontal plane (i.e., generally about a 105° vertical angle between the wing portions 224 and 226 and the central base 222 of the middle blade form 220). Further, the point of intersection of the wing portions 224 and 226 and the central base 222 of the middle blade form 220, the bend line, makes an angle generally about 34.5° with the center line of the S-shaped middle blade form's central base 222. These precise angles provide for improved interaction between the middle blade form 220, the jar wall 114, and the processed items (not shown).

Figure 5:
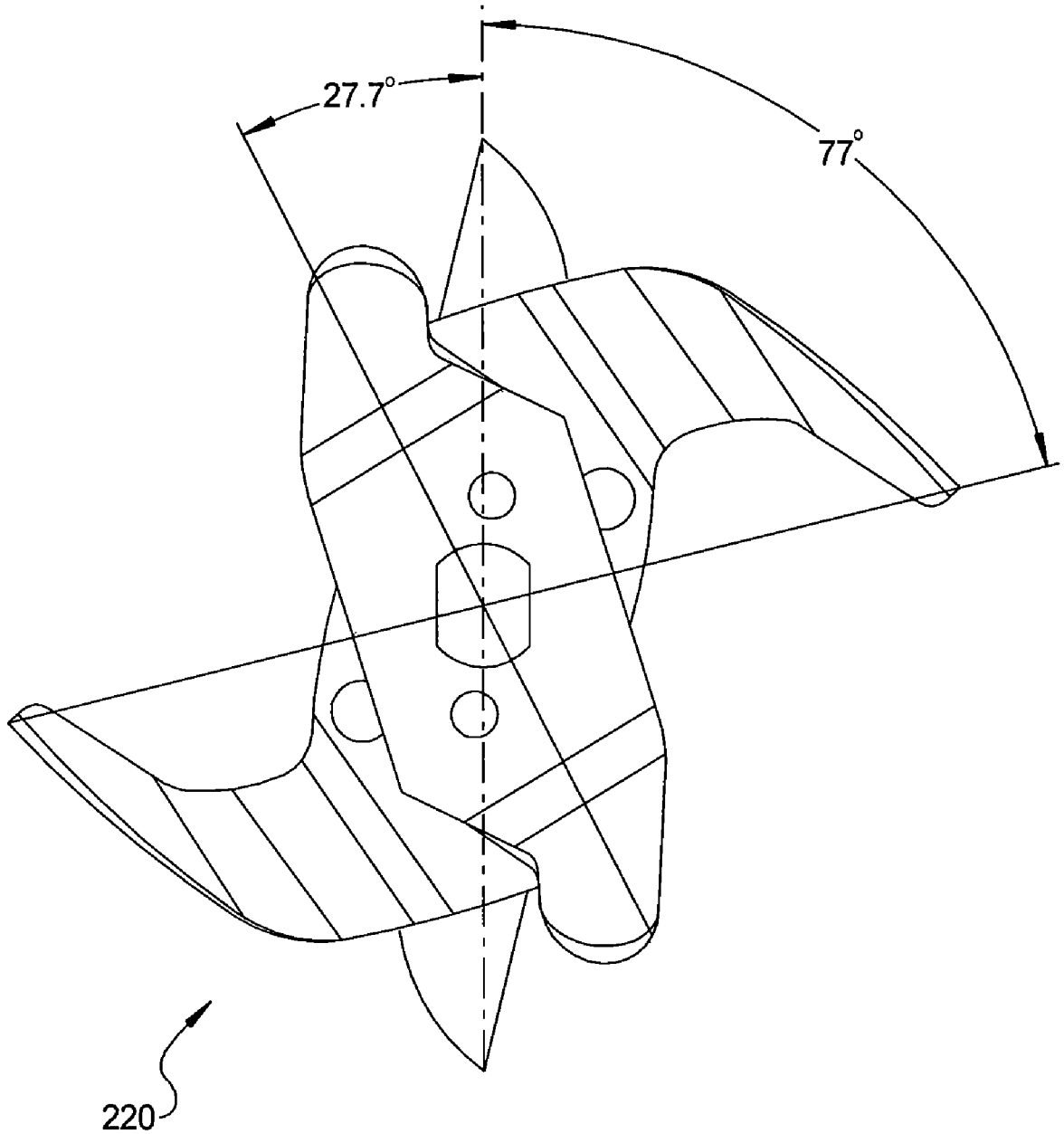
FIG. 5 shows a top view of the blade stack of FIG. 4A and indicating relative blade orientations.
Figure 6:
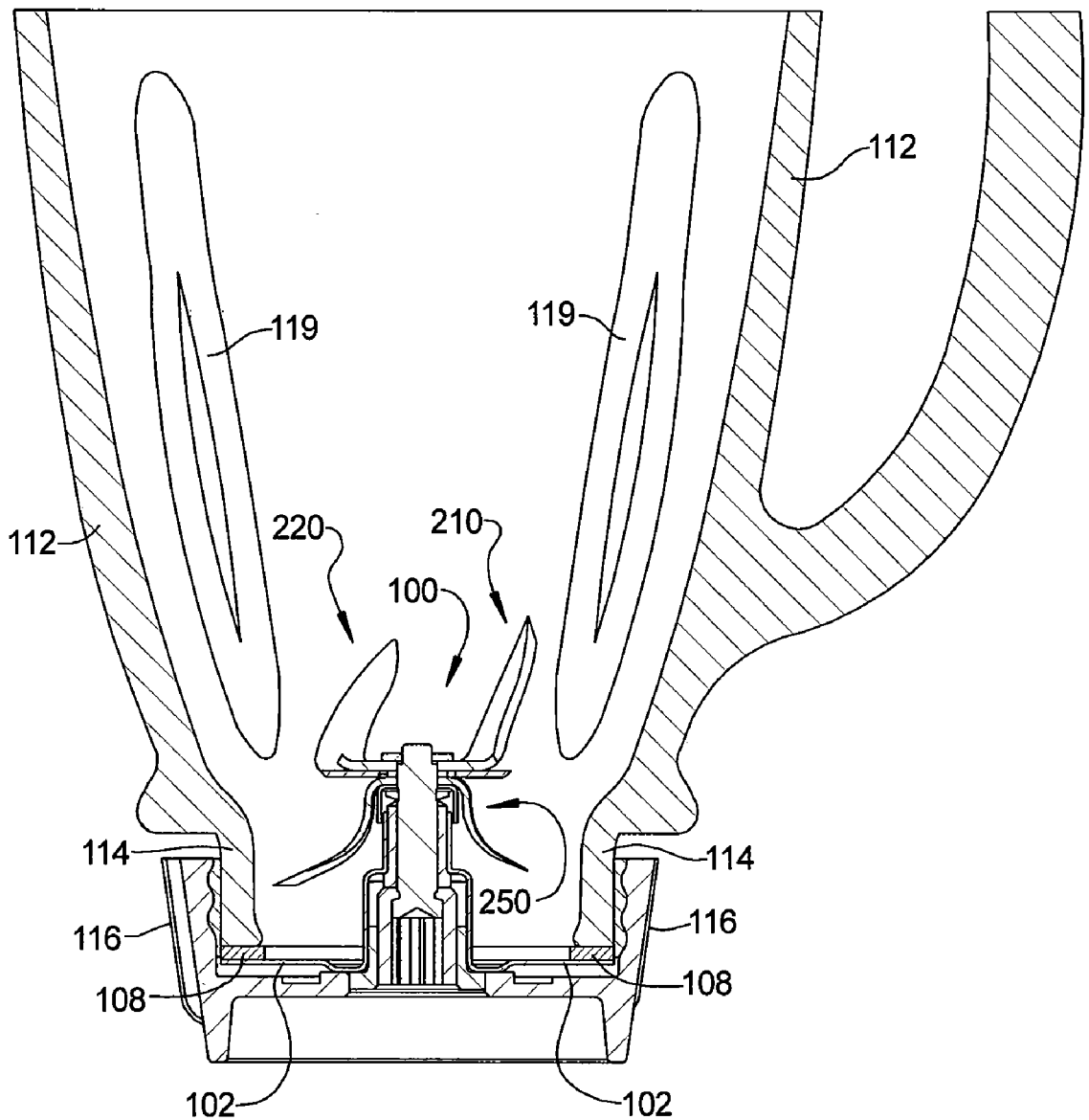
FIG. 6 shows a cross-section view of the blade assembly of FIG. 1 mounted in small throat jar in a combination blender/food processor.

With regard to the interaction of the top, bottom and middle blade forms 210, 220, and 230, FIG. 5 best shows their respective orientation to one another. The blade tips of the blending blades, the top and bottom blade forms 210 and 230, are offset by an angle generally about 27.7° and the angle formed between the tips of the middle and bottom blade forms 220 and 230 is generally about 77°. It is these angles of rotation and the various angles of lift on the individual wing portions of the various blade forms that directly drive the performance of the blade assembly 100 by reducing interference by one blade form with another while enhancing the ability to circulate the blended/processed items and reducing the wear-and-tear on the assembly's bearings and the blender/processor motor (not shown).

In use, the blade assembly 100, in accordance with the preferred embodiment, is mounted within a blender/food processor appliance base 116 having a motor suited for driving the blade assembly 100. The blender jar 112 is mounted over the blade assembly 100 and within the appliance base 116. The sealing gasket 108 located between the blade assembly base 102 and the bottom 118 of the jar 112 serves to make the combined structure water tight.

Upon the introduction of items into the jar 112 to be blended/processed, a user may initiate the operation of the appliance. The top blade form 210 serves to effectively crush ice. The middle blade form 220 with its long continuous radius edge blade operates to process solid food stuffs including heavier items such as nuts, vegetables, and meats. Finally, the bottom blade form 230 operates to assist in the mixing of larger particulate matter and liquids by enhancing circulation of the items being blended/processed and to liquefy soft food items, such as tomatoes.

The circulation of the items within the blending jar 112 are based on a complex combination of the fluid dynamics of the blades forms 210, 220, and 230 and the interior shape of the jar 112. In order to introduce additional mixing of the contents of the jar 112, at roughly equal spacing about the interior of the jar 112 are provided rib structures 119 that introduce a interference in the rotational flow stream of the contents during operation of the appliance. Further, the blade form geometries themselves serve to introduce lifting forces to the jar's contents. Instead the blades are designed to avoid cavitation which may serve to reduce the effectiveness of the blade assembly 100, as well as decrease bearing and motor life in the appliance.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

The invention claimed is:

1. A blade assembly suited to use in a small throat blender jar, comprising:

a base having an integrally formed, centrally located hollow post extending from one surface thereof;

a collared rotating shaft having a first end and a second end, the shaft removably mounted within the post;

a blade stack secured to the first end of the rotating shaft, the second end suited for securement to a means for driving the rotating shaft, and wherein the blade stack comprises a top blade form, middle blade form, and bottom blade form, the middle blade form being positioned between and proximate to the top and bottom blade forms and including a central base portion and a pair of wing portions both extending at an angle upward from the central base and rearward from a center line of the central base.

2. The blade assembly of claim 1 wherein the top blade form is generally U-shaped suited for crushing ice.

3. The blade assembly of claim 1 wherein the bottom blade form is generally U-shaped suited for both liquefying and mixing, wherein the blades curve outward away from the rotating shaft.

4. The blade assembly of claim 1 wherein the the middle blade form is generally suited for chopping, cutting, and slicing solid foodstuffs.

5. The blade assembly of claim 4 wherein the upward and rearward sweep of the leading edge of the wing portions of the middle blade form generates a longer continuous-radius edge than others of the individually shaped blade forms.

6. A blade stack for use in a small throat blender jar, comprising:

a generally U-shaped top blade form;

a generally U-shaped bottom blade form, comprising a central base and a pair of opposed curved wing portions extending at an angle downward from the central base; and a middle blade form being positioned between and proximate to the top and bottom blade forms and comprising a central base and a pair of wing portions each extending upward at an angle from the central base, and the wing portions curving away from a center line of the central base to form a continuous-radius edge along the leading edge of the middle blade form.

7. The blade stack of claim 6 wherein the top blade form is particularly suited for crushing ice.

8. The blade stack of claim 6 wherein the bottom blade form is particularly suited for liquefying and mixing soft foods and liquids.

9. The blade stack of claim 6 wherein said middle blade form is particularly suited to chopping, cuffing, and slicing hard foods and meats.

10. The blade stack of claim 6 wherein the top, middle, and bottom blade forms are arranged so as to reduce interference by one blade form with another during operation of the blender jar.

11. The blade stack of claim 10 wherein the tip-to-tip center lines of the top blade form and the bottom blade form are offset by generally about 27.7°.

12. The blade stack of claim 10 wherein the tip-to-tip center lines of the middle blade form and the bottom blade form are offset by generally about 77°.

13. The blade stack of claim 6 wherein the angle formed by each-of the wing portions of the middle blade form and the horizontal is generally about 75°.

14. The blade stack of claim 6 wherein the angle formed by the bend line and the center line of the middle blade form is generally about 34.5°.

15. A combination blender and food processor blade assembly arranged for use in a small throat blender jar, comprising:
- a base;
- a housing for retaining a rotation means, wherein the rotation means has a first end and a second end;
- a blending and processing means secured to the first end of the rotation means; and
- wherein said blending and processing means comprises a top crushing means, middle cutting, chopping and slicing means, and bottom mixing and liquefying means, the middle cutting, chopping, and slicing means form being positioned between and proximate to the top and bottom means and comprises a generally flat central base and a pair of opposed wing portions extending upward at a first angle from the central base and curving rearward at a second angle formed by a line defining the intersection of the each wing portion with its respective end of the central base and a center line of the central base so as to form a continuous-radius edge on each wing portion.

16. The combination blade assembly of claim 15 wherein the top crushing means is generally for crushing ice, a middle cutting, chopping, and slicing means is generally for cutting, chopping, and slicing hard foodstuffs, and the bottom mixing and liquefying means is generally for mixing and liquefying soft foodstuffs and liquids.

17. The combination blade assembly of claim 16 wherein the top crushing means comprises a generally flat central base and a pair of opposed wing portions extending upward at an angle from the central base to form generally a U-shape configuration.

18. The combination blade assembly of claim 17 wherein the measured angle formed by a first wing portion of the top crushing means and the central base and the measured angle formed by a second wing portion of the top crushing means and the central base are not equal.

19. The combination blade assembly of claim 16 wherein the bottom mixing and liquefying means comprises a generally flat central base and a pair of opposed wing portions extending downward and curving outward at an angle from the central base to form generally a U-shaped configuration.

* * * * *